W. F. FOLMER.
FILM WINDING KEY FOR CAMERAS.
APPLICATION FILED DEC. 9, 1911.
1,023,933.
Patented Apr. 23, 1912.
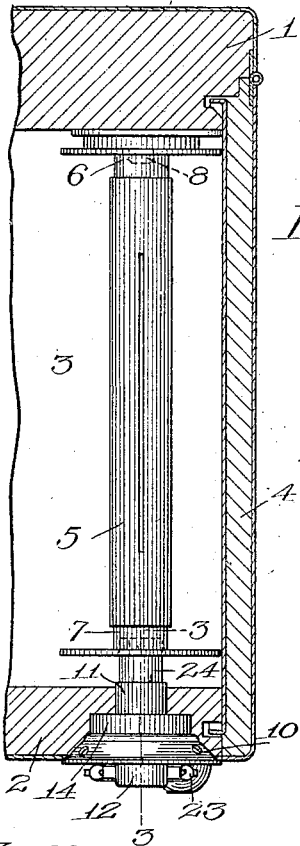
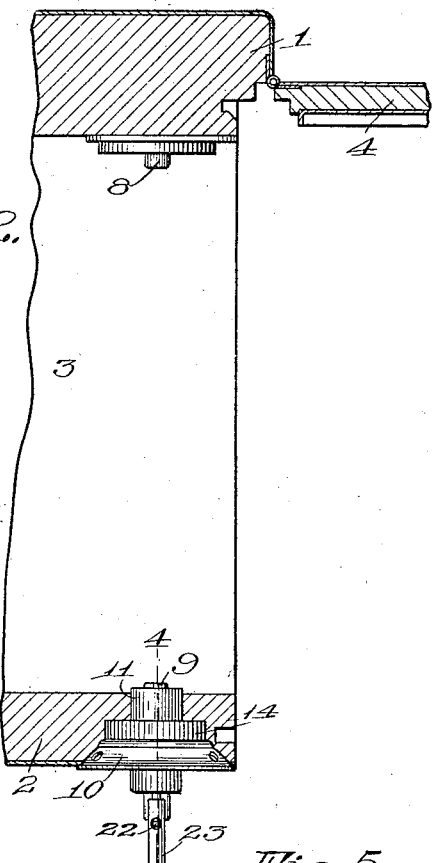
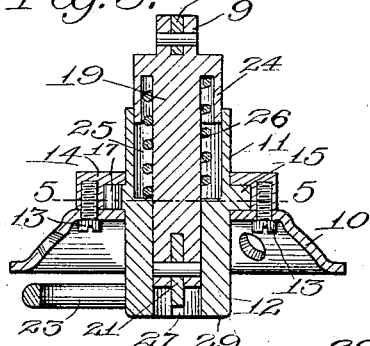
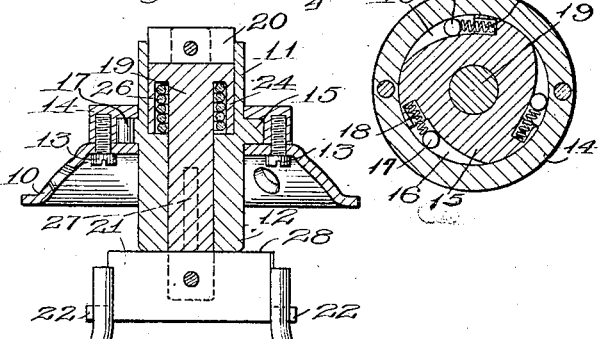
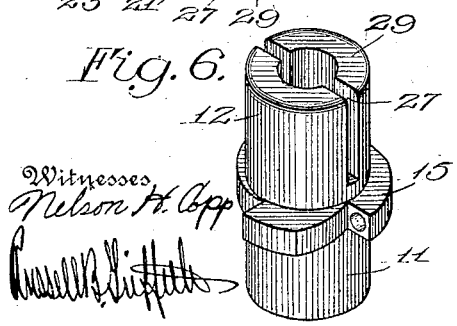
Inventor
WILLIAM F. FOLMER
Witnesses
By
his Attorneys

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

FILM-WINDING KEY FOR CAMERAS.

1,023,933.  Specification of Letters Patent.  Patented Apr. 23, 1912.

Application filed December 9, 1911. Serial No. 664,728.

*To all whom it may concern:*

Be it known that I, WILLIAM F. FOLMER, of Rochester, in the county of Monroe and State of New York, have invented certain new and useful Improvements in Film-Winding Keys for Cameras; and I do hereby declare the following to be a full, clear, and exact description of the same, reference being had to the accompanying drawings, forming a part of this specification, and to the reference-numerals marked thereon.

My present invention relates to photography, and more particularly to photographic cameras or film holders, and it has for its object to provide a simple and efficient winding key for rotating the take-up spool of a film camera the manipulation of which will offer certain conveniences with respect to the operation of engaging it with and disengaging it from the film spool.

A further object of the invention is to so construct the key that it may be automatically retained in the retracted position in which it frees the spool so that the latter may be easily inserted or removed by the operator without the necessity of simultaneously manipulating the key.

To these and other ends the invention consists in certain improvements and combinations of parts, all as will be hereinafter more fully described, the novel features being pointed out in the claims at the end of the specification.

In the drawings: Figure 1 is a sectional view through the film chamber of a roll holder or camera body showing in side elevation a winding key constructed in accordance with and illustrating one embodiment of my invention, the key being shown in its operative position or in the act of holding the spool in position ready for rotation; Fig. 2 is a similar view, but showing the key retracted and the spool removed; Fig. 3 is a longitudinal section taken substantially on the line 3—3 of Fig. 1; Fig. 4 is a longitudinal section taken substantially on the line 4—4 of Fig. 2; Fig. 5 is a transverse section through the clutch mechanism of the socket piece, taken substantially on the line 5—5 of Fig. 3, and Fig. 6 is a detail perspective view of the socket piece.

Similar reference numerals throughout the several figures indicate the same parts.

I have herein illustrated only a fragment of the roll holding portion of a camera casing comprising top and bottom walls 1 and 2 inclosing the film winding chamber 3 to which access is had through a door 4, usually at the back of the roll holder or camera. The winding spool 5 may be of the ordinary construction having the usual recesses 6 and 7 in its opposite end faces that respectively receive the dead center 8 and the winding center 9. The dead center 8 at one end of the spool is, in the present instance, fixed to the wall 1 of the chamber and is cylindrical to engage the similarly formed recess 6 in the spool end for a free rotation of the latter, but the winding center 9 is of irregular form to interlock with the similarly formed recess 7 in the opposite end of the spool and is carried by the winding stem or key that will now be described.

A preferably depressed or cup-shaped mounting-plate 10 is, in the present embodiment, suitably secured in a depression in the outer face of the opposite wall 2 of the film chamber and carries journaled therein a socket piece 11 having its inner end projecting toward or into the chamber 3 through the wall 2 and its other end 12 projecting outwardly and of tubular form, as shown, the whole piece being of a generally tubular construction. Secured to the underside of the mounting-plate 10, as by the screws 13, is a clutch casing 14 forming, jointly with the plate, a journal into which fits a laterally projecting annular bearing portion 15 on the socket piece 11 that prevents endwise movement thereof and rigidly holds the socket piece against any movement other than a rotary one.

The socket piece is free to rotate, however, in only one direction, in the present instance to the right, or in the direction of winding movement intended for the spool 5. To prevent rotation in a reverse direction a suitable clutch mechanism is employed, and to this end, in the present instance, the annular bearing portion 15 is provided with one or more tapered recesses 16 of which a surface of the clutch casing 14 forms the outer walls, and these recesses are occupied by balls or rollers 17 that are continually urged toward the tapered end by springs 18 so that the socket piece 11 may be rotated in the direction that will cause the rollers to move to the larger ends of the recesses against the tensions of the springs while attempted movement in the other direction will cause the rollers to bind in the smaller ends of the recesses and lock the bearing portion 15 with the clutch casing, as is well understood.

The winding stem, or key proper, 19 is of circular form and extends axially through the socket piece 11 to project from both ends thereof and is free to rotate in both directions therein and to move longitudinally relatively thereto, except when adjusted in a manner hereinafter explained. The inner end, which constitutes the winding center 9, before referred to, is fitted with a suitable non-circular head 20 to interlock with the recess 7 of the film spool, while at the outer end it carries a thumb piece embodying, in the present instance, a cross bar 21 rigidly secured thereto and having trunnions 22 at its ends upon which are pivoted, in the present instance, the arms of a yoke-shaped gripping portion 23 that may thus assume the operative position of Fig. 4 or be folded down, as shown in Fig. 3, when not in use.

Relatively movable cup-shaped recesses 24 and 25 at the inner ends of the socket member 11 and the winding stem 19 jointly house a spring 26, the function of which is to normally tend to thrust the stem inwardly so that the head 20 will engage the spool, as shown in Fig. 1, but when it is desired to release the spool, the stem is retracted, as shown in Figs. 2 and 4, against the tension of the spring and in this connection it is pointed out that the cup-shaped portions 24 and 25 that inclose the spring allow of a considerable range of movement, while still leaving room for the spring when compressed, as in Fig. 4, and thus I am enabled to use a stationary dead center 8 and move the winding center 9 alone a sufficient distance to give room for the detachment of the spool from both centers, instead of also providing for the retraction of the dead center 8, as has been done heretofore.

In the normal or operative position of the winding key the cross bar 21 of the finger portion lies between, and is interlocked with, portions of the socket piece 11 formed, in the present instance, by a diametrical slot 27 in the outer tubular projecting end 12 of the socket piece which it snugly fits so that the socket piece and stem are locked for joint movement when the stem is in engagement with the spool and the clutch 17, acting on the socket member, therefore also prevents the rotation of the stem in other than a winding direction and prevents the key from being inadvertently used to unwind the spool. When the stem is retracted, however, to release the spood, the cross bar 21 of the finger portion leaves the slot 27 and when subsequently rotated in either direction engages with its under surface 28 upon the end face 29 of the tubular socket member and holds the spring 26 compressed so that the stem is prevented from moving inwardly and the operator may, for the moment, drop consideration of the winding key and devote his attention to the manipulation of the spool. After a new spool has been inserted and it is again desired to thrust the head 20 inwardly into engagement therewith, the stem 19 and socket piece 11 may be again inter-locked first by a relative rotary movement followed by a reverse axial movement which last mentioned movement is accomplished by the spring 26. As the stem is turned the cross bar 21 will ride upon the end face 29 of the socket tube until it reaches a diametrical position coincident with the slot 27 whereupon it will immediately drop back into the same and with the one movement interlock the parts and engage the spool end.

Of course, the cross bar 21 may be rotated in either direction in order to reach the slot, but as the socket piece is locked against movement in one direction the more positive way is to rotate the stem in that direction, for if it is rotated in the opposite direction, the friction of the surfaces 28 and 29 may be so great as to prevent relative movement, the socket piece and stem being led to rotate idly as a result. If after the cross bar has settled or partially settled into the slot 27 the head 20 on the stem lies crosswise of the recess 7 in the end of the spool, it will very soon aline itself when the winding movement is started.

I claim as my invention:

1. In a film winding device for cameras, the combination with a rotatable socket piece and a clutch for preventing rotation thereof in one direction, of a winding stem extending into the socket piece and rotatable relatively thereto and means for interlocking the stem and socket piece by an axial movement of the stem relatively to the socket piece.

2. In a film winding device for cameras, the combination with a rotatable socket piece and a clutch for preventing rotation thereof in one direction, of a winding stem extending through the socket piece and provided with a spool engaging head at its inner end and a thumb piece at its outer end, said stem being rotatable in both directions relatively to the socket piece and movable axially therethrough to carry the head into and out of engagement with the spool, and interlocking portions on the socket piece and stem engaged by an inward axial movement of the latter.

3. In a film winding device for cameras, the combination with a rotatable socket piece and a clutch for preventing rotation thereof in one direction, of a winding stem extending through the socket piece and provided with a spool engaging head at its inner end and a thumb piece at its outer end, said stem being rotatable in both directions relatively to the socket piece and movable axially therethrough to carry the head into and out of engagement with the spool, a spring tending to thrust the stem inwardly, coöperating surfaces on the stem and clutch member for holding the former retracted from the spool against the tension of the spring and engaged by a relative rotary movement of the parts, and interlocking portions on said parts automatically engaged by the action of the spring through an inward axial movement of the stem upon further relative rotation of the parts.

4. In a film winding device, the combination with a rotatable socket piece having a projecting tubular outer end portion provided with a diametrical slot and a clutch for preventing rotation thereof in one direction, of a winding stem extending through the socket piece and provided with a spool engaging head at its inner end and a thumb piece at its outer end, said stem being rotatable in both directions relatively to said socket piece and movable axially therethrough to carry the head into and out of engagement with the spool, a spring tending to thrust the stem inwardly and a transversely extending member on the stem arranged to ride on the end face of the tubular portion of the socket piece and hold the head retracted from the spool and to automatically drop into the slot and interlock the stem and socket piece upon further rotation allowing the head to move into engagement with the spool.

5. In a film winding device, the combination with a socket piece and a rotary stem extending therethrough and provided with a head at its inner end adapted to interlock with the film spool, said stem being longitudinally movable to retract the head from the spool, of a spring normally tending to thrust the stem inwardly toward the spool and coöperating surfaces on the stem and socket piece engaged by partial rotation of the stem when retracted for holding the latter away from the spool against the tension of the spring.

WILLIAM F. FOLMER.

Witnesses:
F. F. CHURCH,
FLORENCE E. FRANCK.